United States Patent [19]
Hashimoto

[11] Patent Number: 5,186,138
[45] Date of Patent: Feb. 16, 1993

[54] APPARATUS FOR CONTROLLING THE FUEL PRESSURE IN AN INTERNAL COMBUSTION ENGINE

[75] Inventor: Eiji Hashimoto, Susono, Japan

[73] Assignee: Toyota Jidosha Kabushiki Kaisha, Toyota, Japan

[21] Appl. No.: 792,310

[22] Filed: Nov. 14, 1991

[30] Foreign Application Priority Data

Nov. 16, 1990 [JP] Japan .................. 2-308628

[51] Int. Cl.⁵ ............................................. F02B 77/00
[52] U.S. Cl. ............................. 123/198 DB; 123/456
[58] Field of Search ............ 123/198 D, 198 DB, 510, 123/494, 497

[56] References Cited

U.S. PATENT DOCUMENTS

| | | | |
|---|---|---|---|
| 4,124,013 | 11/1978 | Rivalto | 123/198 DB |
| 4,565,170 | 1/1986 | Grieshaber et al. | 123/198 DB |
| 4,776,315 | 10/1988 | Greiner | 123/198 D |
| 4,807,583 | 2/1989 | Thornthwaite et al. | 123/198 DB |
| 4,811,710 | 3/1989 | Schmitt et al. | 123/198 DB |
| 4,811,711 | 3/1989 | Stumpp et al. | 123/198 DB |
| 5,058,553 | 10/1991 | Kondo et al. | 123/456 |
| 5,076,227 | 12/1991 | Krieger | 123/198 DB |
| 5,095,880 | 3/1992 | Ricks | 123/198 DB |

FOREIGN PATENT DOCUMENTS

62-645 1/1987 Japan .

*Primary Examiner*—E. Rollins Cross
*Assistant Examiner*—Thomas Moulis
*Attorney, Agent, or Firm*—Kenyon & Kenyon

[57] ABSTRACT

An apparatus for controlling a fuel pressure suitable for a direct injection type fuel injection internal combustion engine, using gasoline as a fuel. A low pressure pump and high pressure pump from a fuel tank are arranged in series between a reservoir tank and fuel injectors. A pressure at the output of the low pressure pump is detected to determine if the fuel tank is empty, and when it is determined from the pressure at the outlet of the small pump that the fuel tank is empty, the operation of the high pressure pump is stopped to thereby prevent a generation of bubbles in the reservoir tank. A fuel injection is stopped when there is a drop in the pressure in the reservoir tank.

4 Claims, 9 Drawing Sheets

APPARATUS FOR CONTROLLING THE FUEL PRESSURE IN AN INTERNAL COMBUSTION ENGINE

BACKGROUND OF THE INVENTION

1. Field of the Invention

The present invention relates to an apparatus for controlling the pressure of fuel in a fuel supply line for an internal combustion engine, the fuel supply line being provided with a reservoir tank for holding fuel.

2. Description of the Related Art

A diesel engine provided with a reservoir tank arranged on a fuel supply line for supplying a fuel to the engine is known; see, for example, Japanese Unexamined Patent Publication 62-645. A low pressure pump and a high pressure pump are arranged in series on the fuel supply line, and upstream of the reservoir tank. The fuel from a fuel tank is introduced, via the low pressure pump and then the high pressure pump, into the reservoir tank to which fuel pipes to injectors are connected, whereby fuel having a high pressure is accumulated in the reservoir tank and is introduced into cylinders of the engine via the injectors. A pressure sensor is connected to the reservoir tank, for detecting the pressure of the fuel, and a control device responsive to the detected pressure in the reservoir tank is provided for controlling the operation of the high pressure pump to thereby obtain a predetermined constant pressure of the fuel in the reservoir tank.

If the fuel tank becomes empty, a continuation operation of the high pressure pump causes a generation of bubbles of air in the reservoir tank, before the engine is stopped and fuel charged into the fuel tank, and bubbles thus generated in the reservoir tank cannot be quickly removed when the engine is restarted after the completion of the filling of fuel into the fuel tank, and accordingly, a quick increase in the pressure in the reservoir tank cannot be obtained when the engine is started. This is disadvantageous in that it takes a relatively long time to raise the pressure in the reservoir tank, and thus the engine starting operation is prolonged.

SUMMARY OF THE INVENTION

An object of the present invention is to provide a system capable of preventing a generation of bubbles in the reservoir tank when the fuel tank becomes empty.

Another object of the present invention is to provide a system capable of solving the above-mentioned problem by a provision of means for stopping the operation of the high pressure pump before the reservoir tank is actually empty, i.e., before a shortage of fuel actually occurs in the reservoir tank.

According to the present invention, a fuel supply system is provided for a fuel injection internal combustion engine having injectors for injecting an amount of fuel into the engine, said system comprising:

a fuel tank;

a fuel line connecting the fuel tank to the fuel injectors;

a reservoir tank arranged on the fuel line and adjacent to the fuel injectors, for storing an amount of fuel to be sent to the injectors;

a high pressure pump arranged on the fuel line for introducing fuel from the fuel tank into the reservoir tank;

means for detecting that the fuel tank is becoming empty, and;

means for prohibiting the operation of the high pressure pump when it is detected that the fuel tank is empty.

DESCRIPTION OF THE PREFERRED EMBODIMENT

The embodiment of the present invention is directed to a spark ignition direct fuel injection type internal combustion engine in which gasoline as a fuel is directly introduced into cylinders thereof. Note, Japanese Unexamined Patent Publication No. 2-169834 discloses, in general, such a spark ignition direct injection type internal combustion engine using gasoline as fuel.

Figure 1:
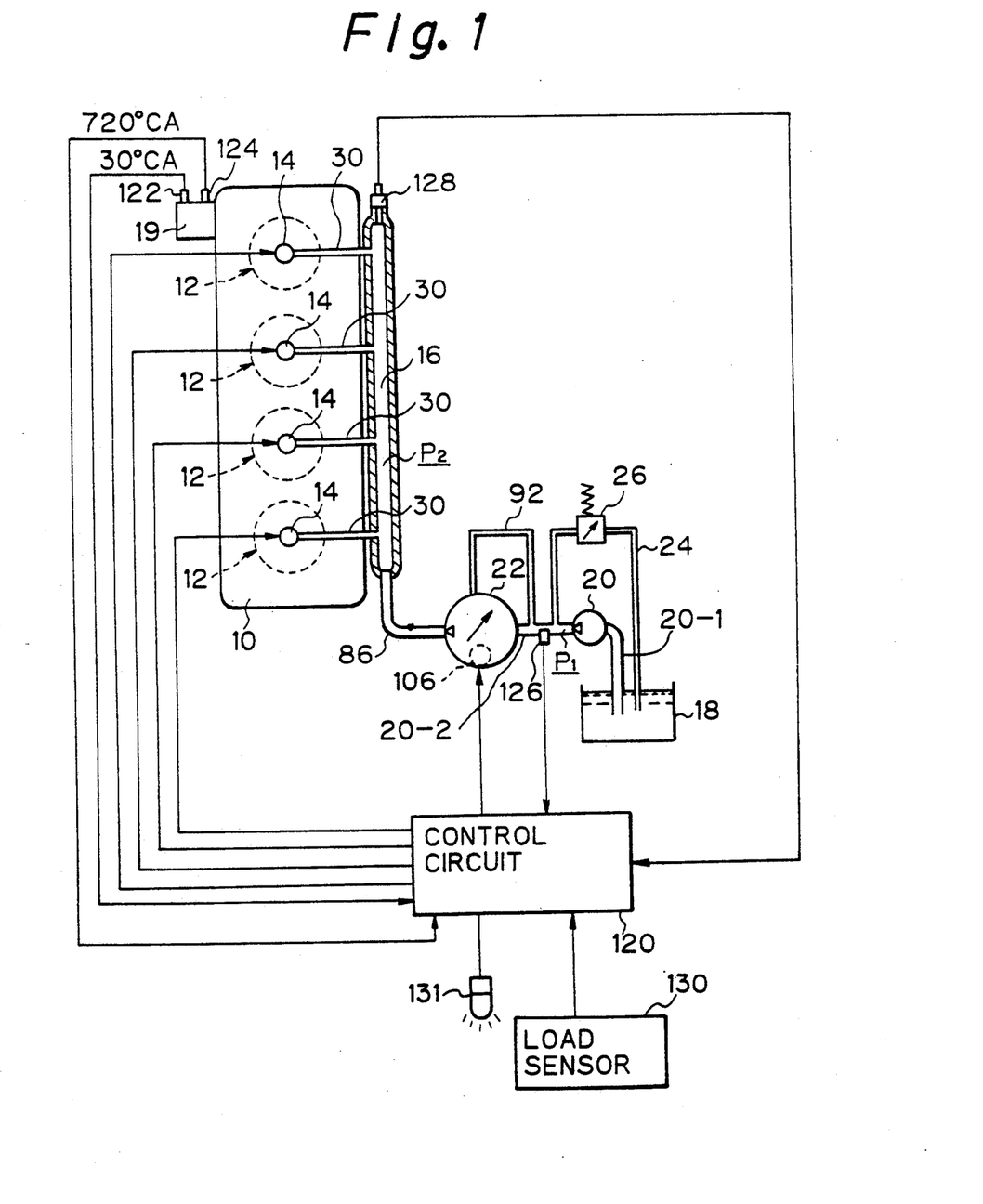
FIG. 1 is a general view of a spark ignition direct injection type internal combustion engine.

In FIG. 1, reference numeral 10 denotes a body of the internal combustion engine having four cylinders 12, 14 denotes injectors arranged at the cylinders 12, 16 is a fuel reservoir tank, 18 is a fuel tank and 19 is a distributor. A low pressure pump 20 has an inlet connected to the fuel tank 18 via a passage 20-1 and an outlet connected to an inlet of a high pressure pump 22 via a passage 20-2. The high pressure pump 22 has an outlet connected to the reservoir tank 16 via a passage 86. A upstream end of relief passageway 24 is connected to the passage 20-2 at a position adjacent to the outlet of the low pressure pump 20, and an output thereof is connected to the fuel tank 18. The passageway 24 is provided with a relief valve 26 for obtaining a constant pressure at the outlet of the low pressure pump 20, i.e., the inlet of the high pressure pump 22.

Figure 2:
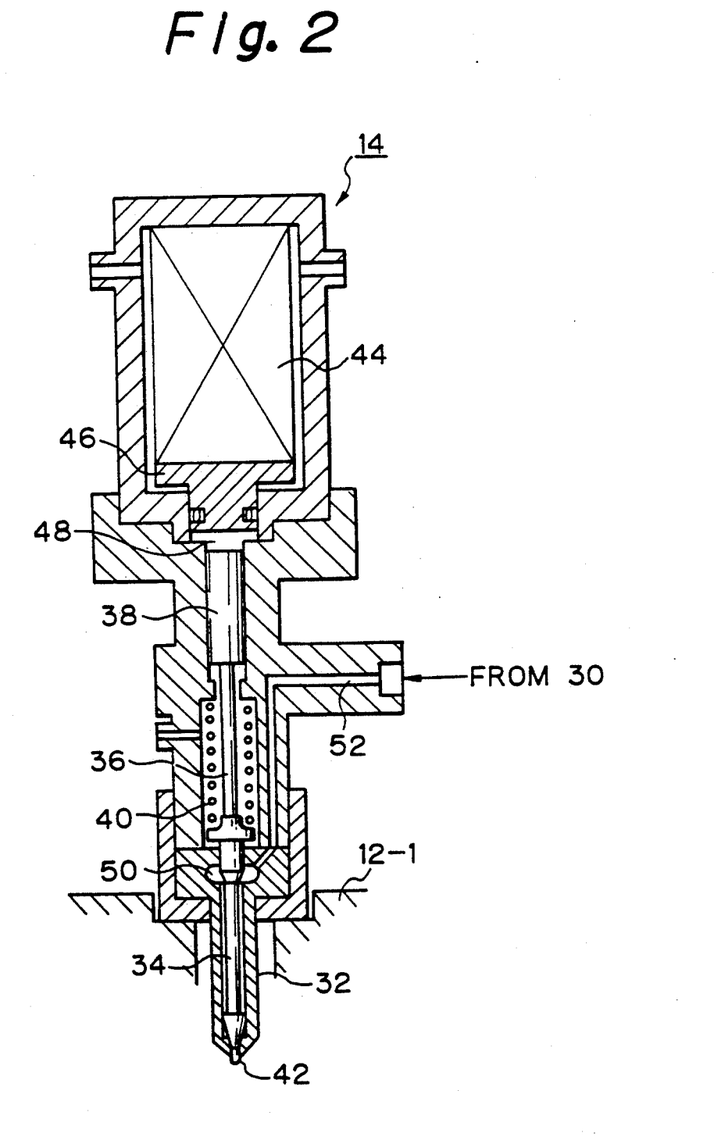
FIG. 2 is a longitudinal cross sectional view of a fuel injector shown in FIG. 1.

The reservoir tank 16 is connected to the fuel injectors 14 at the respective cylinders 12 via respective fuel passages 30. FIG. 2 is a longitudinal cross sectional view of the injector 14, and as shown in FIG. 2, each of the injectors 4 includes a nozzle body 32 connected to the engine body 12 at a cylinder head 12-1, and needle 34 is axially movably arranged in the nozzle body 32. The needle 34 has a bottom portion facing a valve seat formed in the needle body 32 and an upper end connected to a bottom end of a pusher rod 36. The upper end of the pusher rod 36 is connected to a plunger 38, and a spring 40 presses the needle 34 via the pusher rod 36 so that needle 34 is seated on the valve seat directed to a nozzle 42. A piezo-electric actuator unit 44 is constructed by a stack of pressure-electric transducer plates and a piston 46 connected to the bottom end of the stack, whereby a pressure chamber 48 is formed between the piston 46 and the plunger 38. A needle chamber 50 is formed between the needle body 32 and the needle 34, at a position at which it can receive the fuel pressure, and is connected, via a passage 52, to the corresponding fuel passage 30 from the reservoir tank 16. A downwardly directed force, which is sum of a force generated by the pressure in the back pressure chamber 48 and of a force generated by an elastic force caused by the spring 40, and an upwardly directed force caused by the pressure of fuel in the fuel pressure chamber 50, are applied to the needle 34. When the piezo-electric unit 44 is charged, the unit 44 is extended and increases a pressure in the chamber 48 by increasing the downwardly directed force. As a result, the downwardly directed force becomes larger than the upwardly directed force, and thus the needle 34 is seated on the valve seat and closes the nozzle 42, to thereby prevent a fuel injection. When the electric charge in the piezo-electric element unit 44 is discharged, the pressure in chamber 48 is reduced, and accordingly, the downwardly directed force is decreased. As a result, the upwardly directed force becomes larger than the downwardly directed force, and accordingly, the needle 34 is allowed to lift from the valve seat and open the nozzle, to thereby allow the fuel injection to commence.

Figure 3:
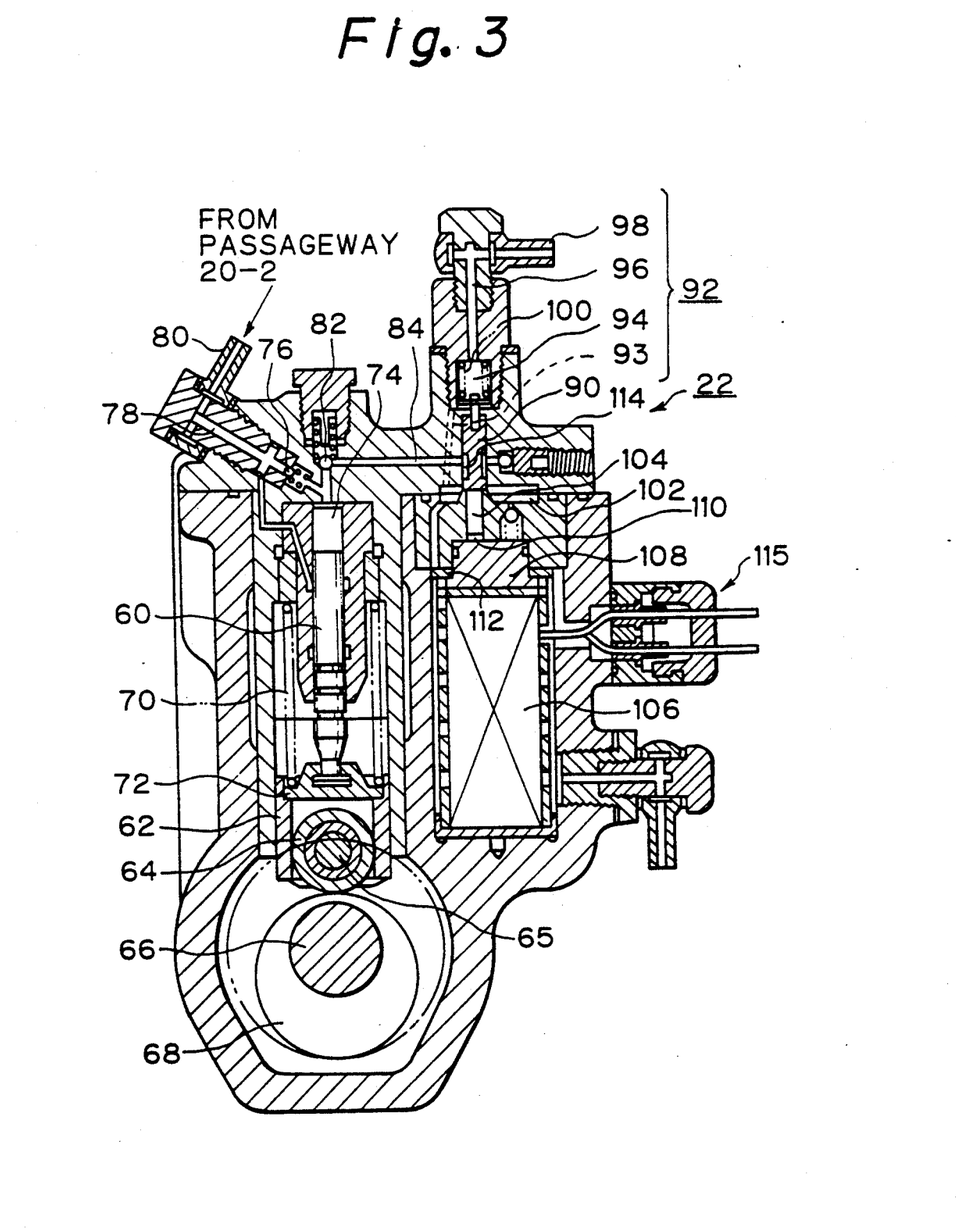
FIG. 3 is a longitudinal cross sectional view of a high pressure pump shown in FIG. 1.

The high pressure pump 22 has a construction as shown in FIG. 3. In FIG. 3, the high pressure pump 22 is provided with a pair of plungers 60. Note, only one of the plungers 60 is shown in the drawing, but another similar plunger is arranged in parallel with the plunger 60 along the direction vertical to the plane of FIG. 3. A more detailed construction of the high pressure pump 20 is shown, for example, in Japanese Unexamined Utility Model Publication No. 63-138438. The plunger 60 is provided at the bottom end thereof with a vertically slidable tappet 62 having a tubular cylindrical shape, and a cam follower roller 64 is connected by a pin 65 extending transversely to the axis of the sliding movement of the tappet 62. A camshaft 66 having an axis extending parallel to the axis of the pin 65 is connected to a crankshaft of the engine by pulleys and a belt (not shown). A cam 68 is mounted on the camshaft 66, and the roller 64 is urged into contact with the cam 68 by a spring 70. A pump chamber 74 is formed on the upper side of the plunger 60, and the volume of the pump chamber 74 is increased or decreased when the tappet 62 is moved upward or downward by the rotation of the cam 68 in cooperation with the cam follower roller 64, to thereby introduce fuel into the chamber 74 or discharge fuel from the chamber 74. The pressure chamber 74 is connected, via a first check valve 76 and a passage 78, to a inlet union 80 connected to the passage 20-2 in FIG. 1 for receiving a flow of fuel from the low pressure pump 20. The pressurizing chamber 74 is connected, via a second check valve 82 and a passage 84, and via a not shown third check valve, to the passage 86 to the reservoir tank 16(not shown in FIG. 3 but shown in FIG. 1) at a position upstream of an overflow valve 90. The overflow valve 90 is a slide valve type and is used for controlling the flow of fuel from the outlet passage 84 from the pump chamber 74 (outlet side of the pump 22) to the inlet side of the pump 22 via an overflow passage 92, to thereby control the amount of fuel introduced into the reservoir tank 16, and thus obtain a desired pressure of the fuel in the reservoir tank 16. The overflow passageway 92 is constructed by a passage 93, a spring chamber 94, a passage 96 and a union 98 connected to the passage 20-2 at the inlet to the high pressure pump 22, as shown in FIG. 1. The valve 90 is formed as a cylindrical body on which an annular groove 114 is formed and is always open to the passage 84. In FIG. 3, the spring 100 urges the overflow valve 90 downward in the drawing so that a bottom end of a valve port 114 is opened to an overflow chamber 102 to which the release passage 93 is opened. An upper end of a vertically slidable pusher pin 104 is in an end-to-end contact relationship with the bottom end of the overflow valve 90. The pusher pin 104 is moved vertical by a piezo-electric unit 106 constructed as a stack of piezo-electric plates, and having a piston 108 mounted on the upper end of the stack. A pressure chamber 110 is formed between the pusher pin 104 and the piston 108 such that the pressure in the chamber 110 controls the vertical position of the pin 104, i.e., the vertical position of the overflow valve 90, to thereby obtain a desired pressure release operation by the overflow valve 90 for obtaining a predetermined pressure in the reservoir tank 16. A Belleville spring 112 is provided for urging the piston 108 downward toward the piezo-electric unit 106, and thus the piston 108 is usually retracted. A connector 115 electrically connects the piezo-electric unit 106 to a control circuit, described later, to thereby operate the piezo-electric unit 106 for obtaining a predetermined constant pressure in the reservoir tank 16.

When the piezo-electric unit 106 is electrically charged it is elongated in the axial direction thereof, whereby the piston 108 is moved upward in the drawing, and thus the pressure in the chamber 100 is increased. The increased pressure in the chamber 110 displaces the pusher pin 104 and the overflow valve 90 upward against the set force of the spring 100, to thereby disconnect the valve port 114 from the overflow chamber 102. As a result, the fuel in the pump outlet passageway 84 cannot flow into the overflow chamber 102, i.e., all of the amount of fuel sent from the pump chamber 74 is introduced, via the passage 84 connected to the passage 86 in FIG. 1, into the reservoir tank 16, and thus the pressure in the reservoir tank 16 is increased. Conversely, when the piezo-electric unit 106 is electrically discharged it is longitudinally contracted, and thus the piston 108 is moved downward by the set force of the spring 112. Due to the downward movement of the pusher pin 104, the overflow valve 90 is also moved downward by the force of the spring 100, and thus the valve port 114 is opened to the overflow chamber 102. As a result, the fuel in the pump outlet passageway 84 flows into the overflow chamber 102 and is returned to the inlet side of the high pressure pump 22 via the release passage 92 constructed by the passage 93, the spring chamber 94, the passage 96 and the union 98, and accordingly, the introduction of the fuel into the reservoir tank 16 is substantially stopped, and therefore, the pressure in the reservoir tank 16 is lowered.

In FIG. 1, the control circuit 120 is constructed as a microcomputer system for controlling the injectors 14 and high pressure pump 22 in accordance with engine operating conditions. A first crank angle sensor 122 is mounted on the distributor 19 and facing a rotating shaft (not shown) of the distributor connected to the crankshaft of the engine, for obtaining a pulse signal at every 30 degrees rotation of the crankshaft. A second crank angle sensor 124 is also mounted on the distributor 19 and facing the rotating shaft, for obtaining a pulse signal at every 720 degrees rotation of the crankshaft. A first pressure sensor 126 is mounted on the outlet of the low pressure pump 20, for obtaining an electric signal indicating a pressure at the output, $P_1$ of the low pressure pump 20, and a second pressure sensor 128 is mounted on the reservoir tank 16 for detecting a pressure $P_2$ in the reservoir tank 16. Furthermore, an engine load sensor 130 detects an indication of an engine load, such as a degree of depression of an acceleration pedal (not shown). The control circuit 120 is connected to a warning lamp 131.

Figures 4, 4A:
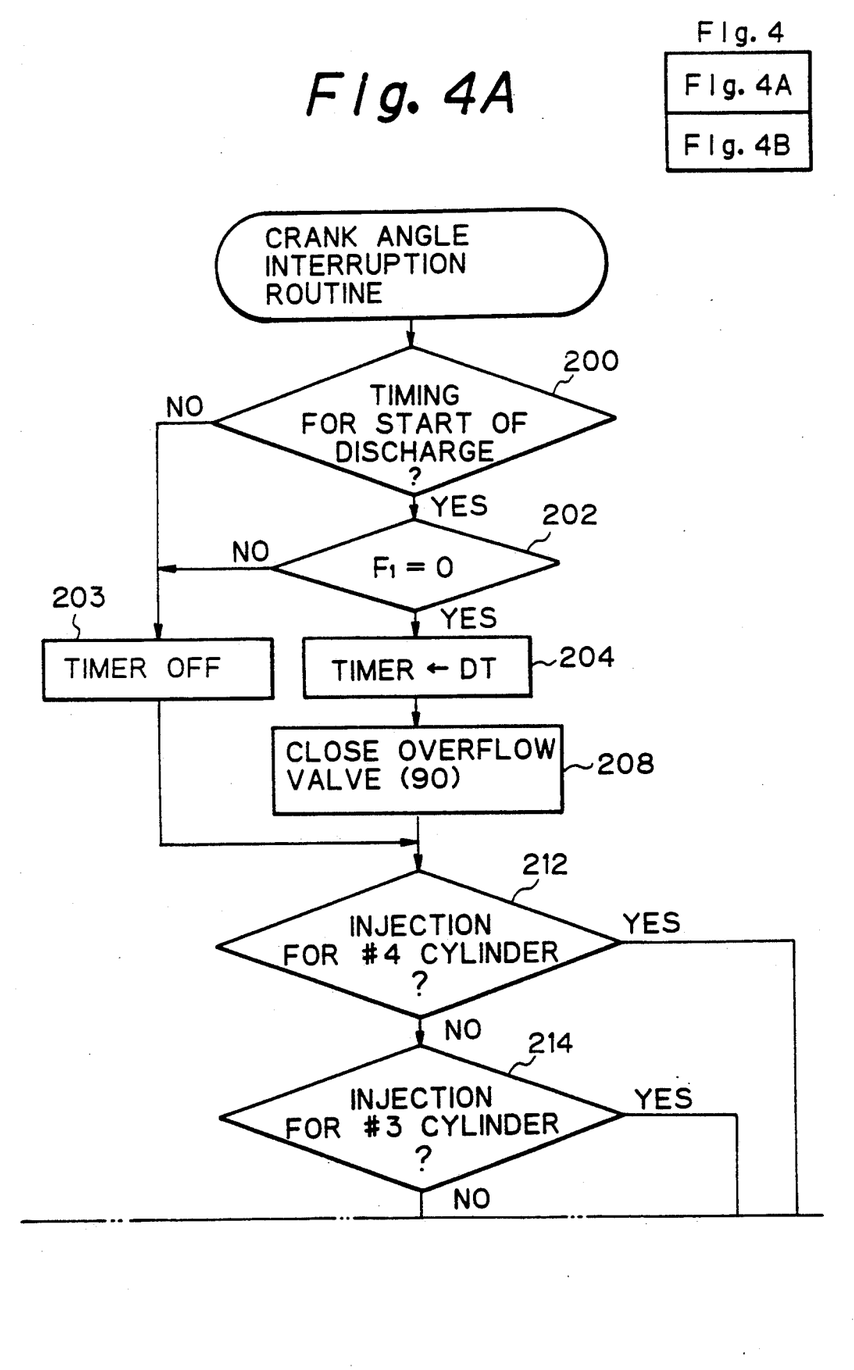
FIGS. 4 to 7 are flow charts illustrating the operation of the control circuit shown in FIG. 1; and, FIGS. 8-(a) to (d) are timing charts of the operation of the control circuit shown in FIG. 1.
Figure 4B:
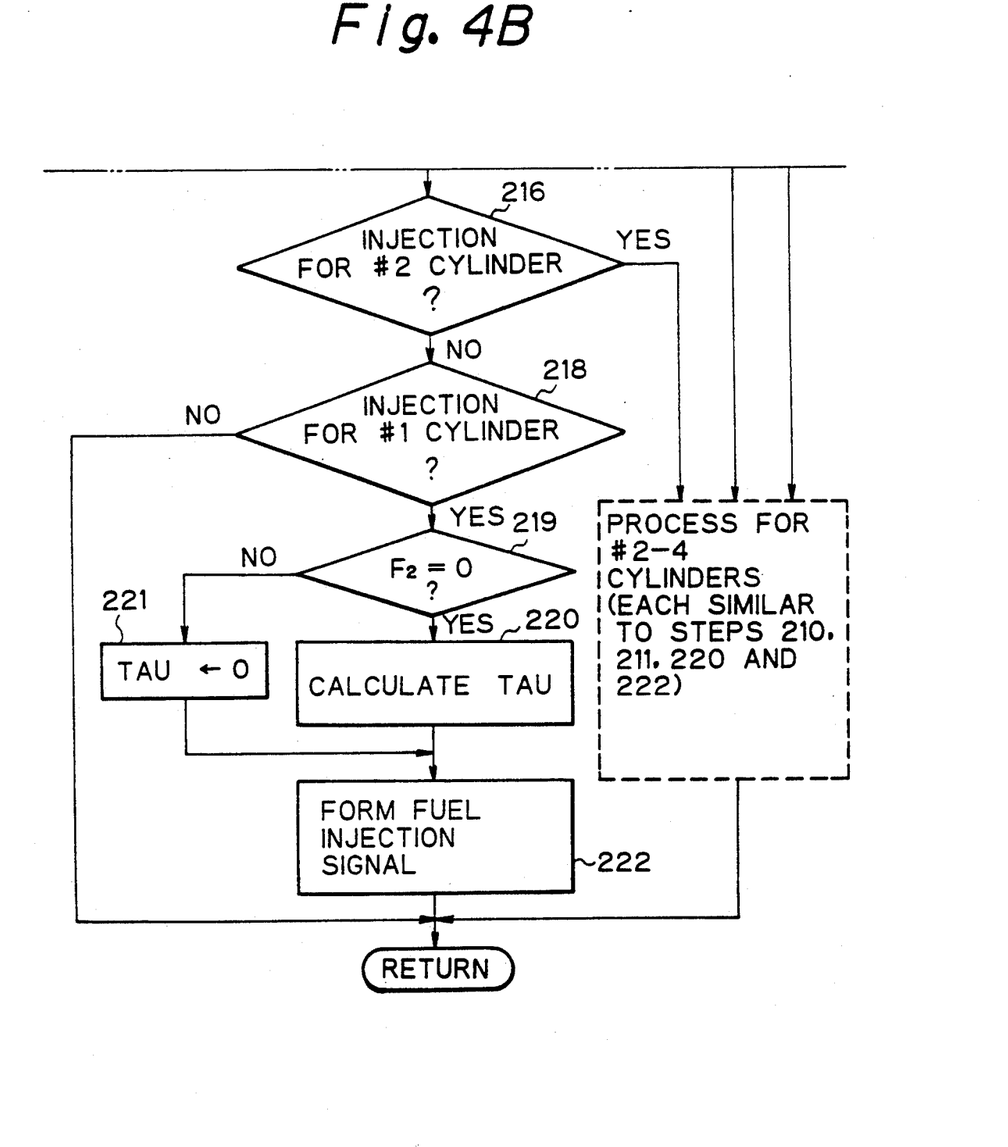

The operation of the control circuit 120 will be described with reference to the flowcharts shown in FIG. 4 to 7. FIG. 4 is a flowchart of a routine executed at every 30° rotation of the crankshaft for controlling the fuel injection from the injectors 14, and for controlling the amount of fuel discharged from the high pressure pump 22. This routine in FIG. 4 is a crank angle (CA) interruption routine executed when receiving a 30° CA pulse signal from the first crank angle sensor 122. Steps 200 to 208 are a routine for controlling the amount of fuel discharged from the high pressure pump 22. At step 200, it is determined if the timing of the discharge of fuel from the high pressure pump 22 has commenced. FIG. 8-(a) schematically illustrates a waveform of a pulse signal for operating the high pressure pump, wherein the signal becomes high for a period DT during one cycle corresponding to a 180° rotation of the crankshaft. Namely, the piezo-electric unit 106 of the high pressure pump 22 is charged for the period DT during one cycle (180°) whereby the overflow valve 90 is closed and fuel from the high pressure pump 22 is discharged to the reservoir tank 16. As explained above, the high pressure pump 22 is provided with two plungers 60 operated by a common camshaft 66 connected to the crankshaft of the engine at a rotating speed ratio of 1:1, and thus there is a phase difference of 180° CA between the angular positions of the plungers 60. As a result, as shown in FIG. 8-(b), a peak in the output pressure appears at every rotation of the crankshaft by an angle of 180°. The timing of the pump operating signal as shown in FIG. 8-(a) is such that the start of the high level state of the pump operating signal coincides with the timing of the start of the increase in the pump outlet pressure during each cycle, as shown in FIG. 8-(b). The determination of the step is made by using a counter, which is incremented at each output of the 30° pulse signal from the first crank angle sensor 122 and is cleared at each output of the 720° signal from the second crank angle sensor 124, as is well known to those skilled in this art.

Figure 8A:
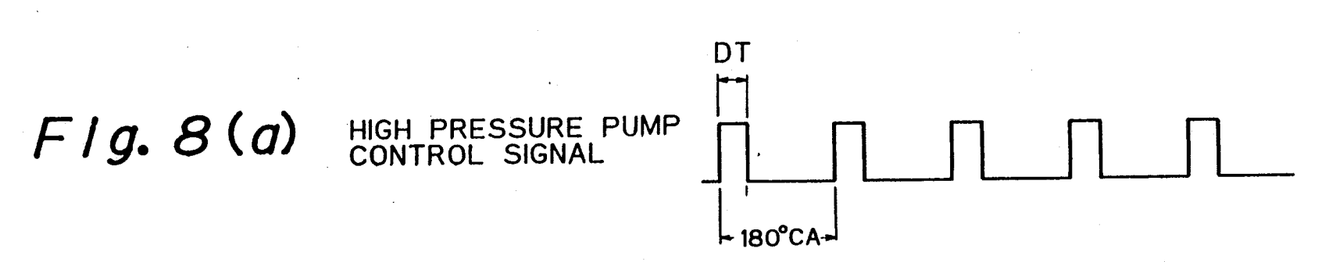
Figure 8B:
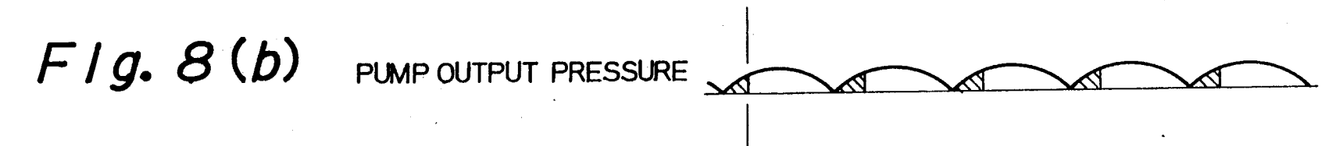
Figures 8C, 8D:
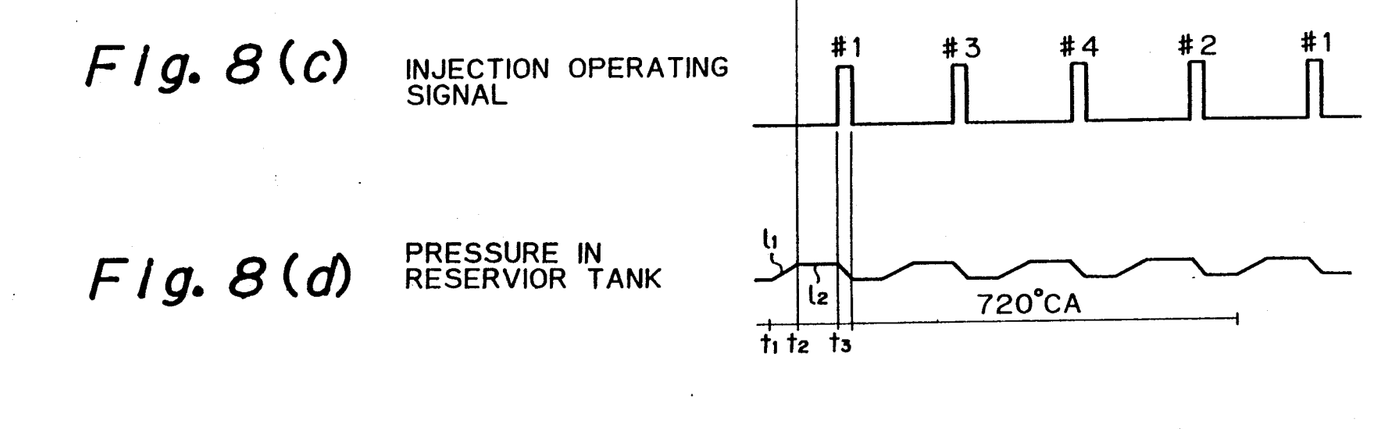

When it is determined at step 200 that the timing occurs once at each rotation of the crankshaft by 180° whereby the discharge of fuel from the high pressure pump 22 is commenced (YES result at step 200 corresponding to time $T_1$ in FIG. 8), the routine goes to step 202 and it is determined if a flag $F_1$ is set (1). The flag F is a high pressure pump operation prohibiting flag and is set (1), as described later, when the amount of fuel remaining in the reservoir tank 16 is smaller than a predetermined value, to thus prohibit an operation of the high pressure pump 22 and thereby prevent a generation of bubbles in the reservoir tank 16. When it is determined that the flag $F_1$ is reset (0), i.e., when the operation of the high pressure pump 22 is not prohibited, the routine goes to step 204, and a value of DT is moved to a timer, wherein DT is a duration of an ON state of the pump operating pulse signal, as explained with reference to FIG. 8-(a). The timer measures the time for which the overflow valve 90 is closed, to allow the fuel from the high pressure pump 22 to be discharged into the reservoir tank 16. Namely, DT corresponds to a duty ratio of the pump operating signal, i.e., the ratio of a duration of an ON state (overflow valve 90 closed) to the duration of an OFF state (overflow valve 90 open). The value of the duty ratio (DT) corresponds to the amount of fuel discharged from the high pressure pump 22 to the reservoir tank 16, and the greater the value of DT, the larger the amount of fuel discharged from the high pressure pump 22 to the reservoir tank 16. At step 208, a signal is output to the piezo-electric unit 106 from the control circuit 120, to energize it so that the overflow valve 90 in FIG. 3 is moved upward and closed to thereby disconnect the groove 114 from the overflow chamber 102 and allow the fuel from the high pressure chamber 22 to be discharged into the reservoir tank 16. As a result, the pressure inside the reservoir tank 16 is increased as shown by a line $l_1$ in FIG. 8-(d) as long as the overflow valve 90 is closed.

Figure 5:
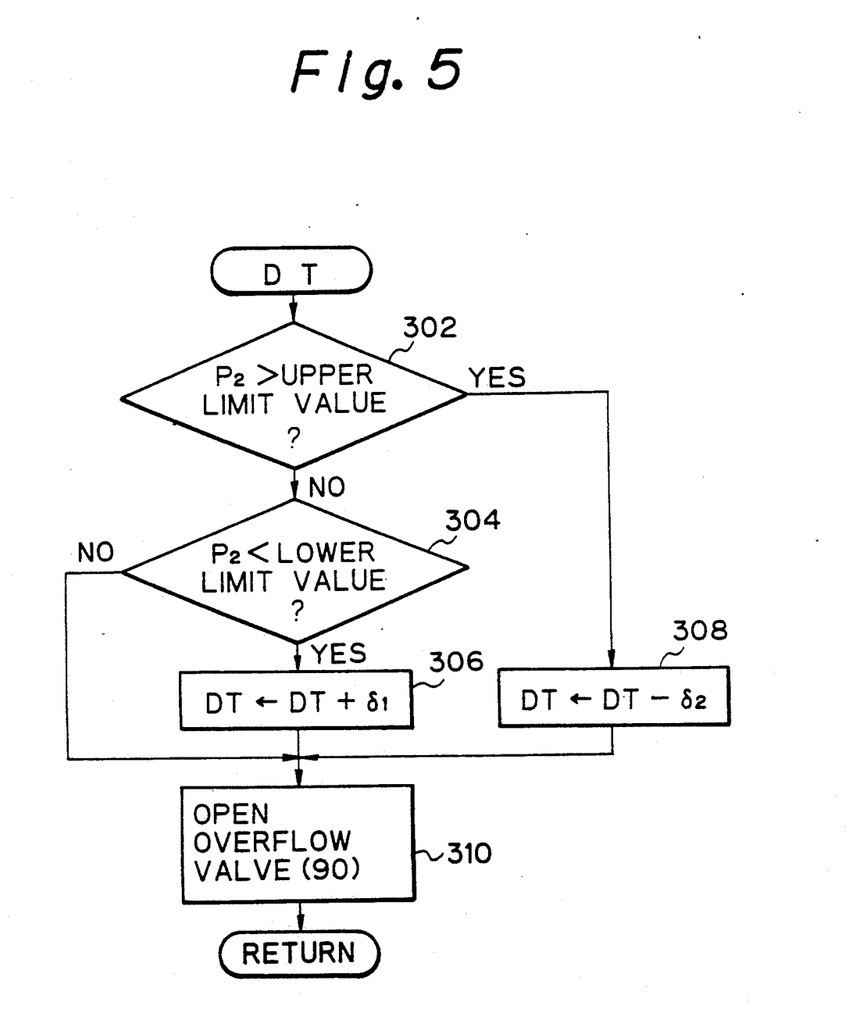

When time corresponding to the DT value measured by the timer has elapsed at time $t_2$ in FIG. 8, a time interruption routine as shown in FIG. 5 is commenced, and the routine goes to step 302, where it is determined if the value of the pressure $P_2$ in the reservoir tank 16 detected by the second pressure sensor 128 is larger than the upper limit, for example, 200 kg/cm3, in a control range of the pressure of the reservoir tank 16, and at step 304, it is determined if the value of the pressure $P_2$ in the reservoir tank 16 is smaller than the lower limit, for example, 195 kg/cm3, in the pressure control range. When it is determined that $P_2 < 195$ kg/cm$^3$ at step 304, the routine goes to step 306 and the DT value (duty ratio in the pump operating signal in FIG. 8-(a) is incremented by a value $\delta_1$, to thereby increase the duty ratio of the pump operating pulse signal at the following pump operating routine (step 200 in FIG. 4) executed at every 180° CA of the crankshaft, to thus increase the amount of fuel discharged into the reservoir tank 16 from the high pressure pump 22 and thereby increase the pressure therein. When it is determined that $P_2 > 200$ kg/cm$^3$ at step 302, the routine goes to step 308 nd the DT value is decremented by a value $\delta_2$, to thereby decrease the duty ratio of the pump operating pulse signal at the following pump operating routine, to thus decrease the amount of fuel discharged into the reservoir tank 16 and thereby decrease the pressure in the reservoir tank 16. When it is determined that the pressure is between the lower limit (195 kg/cm$^3$) and the higher limit (200 kg/cm$^3$), the steps 203 and 204 are by-passed. As a result, the pressure $P_2$ in the reservoir tank 16 is controlled to a desired value between the lower limit and the upper limit.

After the determination of the duty ratio for the following 180° CA interruption process, the routine goes to step 310 and an OFF signal is output to the piezo-electric unit 106, whereby the overflow valve 90 is opened to prevent a discharge of fuel from the high pressure pump 22 to the reservoir 16, and thus a predetermined pressure is maintained in the reservoir tank 16 as shown by an arrow $l_2$ in FIG. 8-(d).

Returning to FIG. 4, the steps following step 210 are used for obtaining a fuel injection. At steps 212, 214, 216 and 218, it is determined if this timing is for the fuel injection at the respective cylinders. In this embodiment of the present invention directed a four cylinder engine, the fuel injections take place independently at each cylinder at intervals of a 180° CA, as will be seen from FIG. 8-(c). Note, the timing $t_3$ of the commencement of the fuel injection is determined such that it occurs after the pressure $P_2$ in the reservoir tank 16 has reached the predetermined value. Furthermore, as disclosed in Japanese Unexamined Patent Publication No. 2-169834 directed to the direct fuel injection type spark ignition internal combustion engine, the fuel is injected into a cylinder during the compression stroke when the engine load is low, and is injected between the intake and compression strokes when the engine load is high. The step 212, 214, 216 or 218 is determined by the number of a counter, which is incremented at every input of a 30° CA signal from the first crank angle sensor 122 and cleared at the input of a 720° CA signal from the second crank angle sensor 124, as is well known to those skilled in this art. When it is determined that the timing is for a fuel injection at a cylinder, for example, the first cylinder (#1), the routine goes from step 218 to step 219 and it is determined if a flag $F_2$ is set. This fuel injection prohibiting flag $F_2$ is set (1) when it is determined that the fuel injection is prohibited by a detection that the reservoir tank 16 is almost empty, as will be fully described later. When it is determined that the flag $F_2$ is reset (0), i.e., the fuel injection can proceed, the routine goes from step 219 to step 220 and a fuel injection amount TAU corresponding to a period for which the corresponding fuel injector 14 is open is calculated from the engine operating conditions, i.e., basically, the engine speed and engine load. Namely, a map of values of a fuel injection amount TAU with respect to combinations of values of an engine speed Ne and engine load is provided, and a well known map interpolation calculation is carried out to obtain a value of the injection fuel amount TAU corresponding to a combination of a detected engine speed Ne and detected engine load. As is well known, the engine speed is detected from the internal between two adjacent 30° CA pulses from the first crank angle sensor 122. At step 222, a process for operating the piezo-electric unit 44 of the injector 14 of the corresponding cylinder is carried out. Namely, the injector 14 is closed when the piezo-electric unit 44 is energized, and is open when the piezo-electric unit 44 is de-energized. Therefore, at the timing $t_3$ the piezo-electric unit 44 is de-energized. Namely, at the timing $t_3$ for commencing the fuel injection in FIG. 8, the piezo-electric unit 44 is de-energized to allow the fuel injection from the nozzle to commence, and at the timing $t_4$ for stopping the fuel injection, the piezo-electric unit 44 is again energized to prevent fuel from being injected from the nozzle 42. In the embodiment of the present invention, the fuel injection operations by the remaining injectors are carried out independently but are basically similar to that of the first cylinder injector, and therefore, a description of these operations is omitted.

Figure 6:
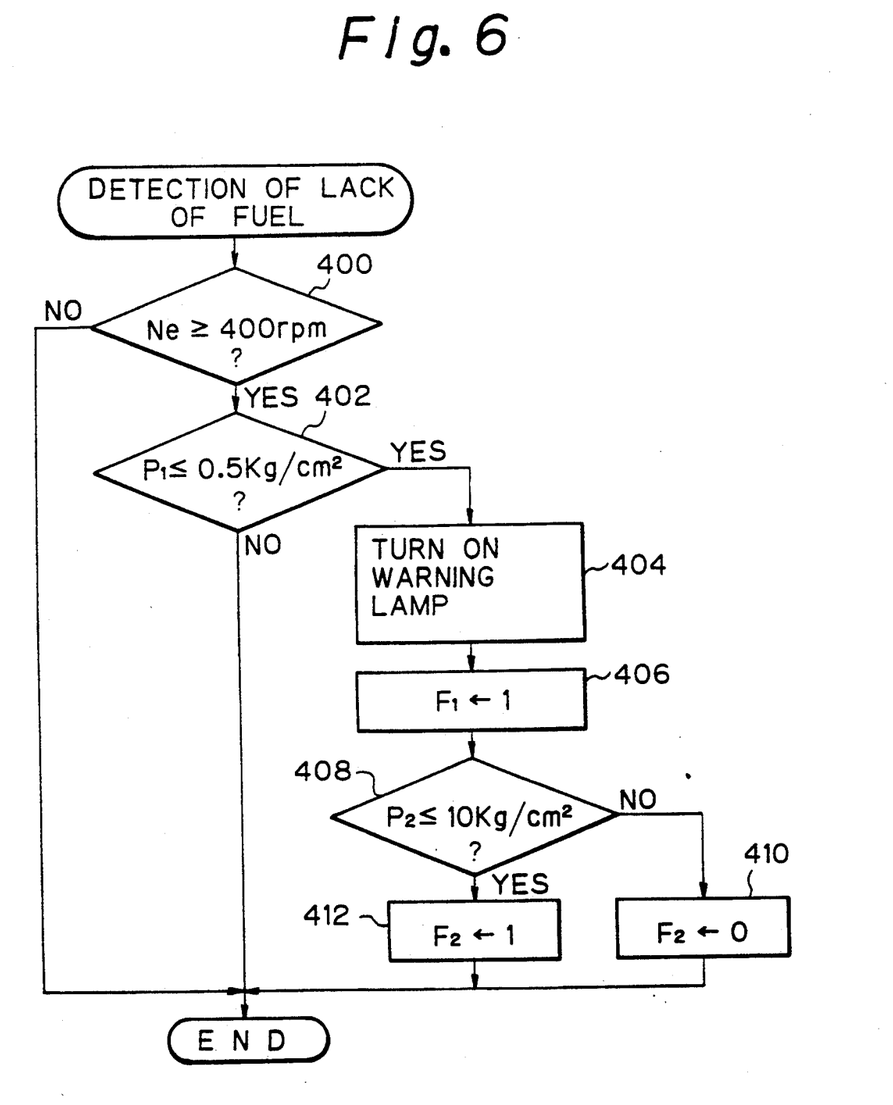

FIG. 6 shows a routine for detecting a shortage of fuel. Such a shortage of fuel is detected when the pressure P at the outlet of the low pressure pump 20 becomes lower than a predetermined value. As will be described later, upon detecting a shortage of fuel in the fuel supply system, the discharge of fuel from the high pressure pump 22 is stopped and the fuel injection operation is prohibited. The routine in FIG. 6 is located in a main routine executed when the ignition key switch (not shown) is turned ON, and is repeatedly executed as long as the switch is turned ON. At step 400 it is determined if the engine speed Ne is equal to or higher than a predetermined value (for example, 400 r.p.m.) lower than an engine idling speed. An engine speed Ne lower than 400 r.p.m. is not suitable for determining a fuel shortage by the pressure at the outlet of the small pressure pump 20, and therefore, the step following step 402 is by-passed. When it is determined that the engine speed Ne≧400 r.p.m., i.e., the engine condition is suitable for determining a fuel shortage by the pressure at the outlet of the small pressure pump 20, the routine goes to step 402 and it is determined if the pressure $P_1$ at the outlet of the low pressure pump 20, measured by the first pressure sensor 126, is equal to or less than a predetermined lower limit, such as 0.5 kg/cm². When it is determined that $P_1 > 0.5$ kg/cm², it is determined that a proper amount of fuel has been introduced from the fuel tank 18 to the reservoir tank 16 via the high pressure pump 22, i.e., there is no shortage of fuel in the reservoir tank 16, and therefore, the routine following step 404 is canceled.

When it is determined that $P_1 \leq 0.5$ kg/cm² at step 402, it is considered that a necessary amount of fuel has not flowed from the fuel tank 18, i.e., the residual amount of fuel in the reservoir tank 16 is small, and therefore, the routine goes to step 404 and a warning lamp 131 is turned ON. At step 406, the flag $F_1$ is set (1), and therefore, at step 202 of the fuel injection routine shown in FIG. 4, the routine goes to step 203 and the timer is turned OFF, and thus the overflow valve 90 is held open even if the fuel injection timing of the cylinder (YES result at step 200) is obtained. As a result, an operation of the high pressure pump 22 is not supplied to the reservoir tank 16. A continuation of the operation of the high pressure pump 22 when the fuel tank 18 is empty would cause a generation of bubbles in the reservoir tank 16, and thus would make it difficult to start the engine after the fuel tank is again filled with fuel, because it takes a long time to expel the bubbles from the reservoir tank. According to the present invention, this difficulty is avoided because the fuel discharge operation by the high pressure pump 22 is stopped when it is determined that the fuel tank 18 is empty by detecting that the pressure $P_1$ at the outlet of the low pressure pump 20 is lower than the predetermined lower limit (YES result at step 402). Thus, according to the present invention, the engine can be easily re-started after the fuel tank is again filled, because the occurrence of bubbles in the reservoir tank 16 is prevented.

At step 408, it is determined whether the pressure $P_2$ in the reservoir tank 16 is equal to or less than a predetermined value, such as 10 kg/cm². When it is determined that $P_2 > 10$ kg/cm², i.e., some amount of fuel still remains in the reservoir tank 16, the routine goes to step 410 and the fuel injection prohibiting flag $F_2$ is held cleared (0), and therefore, a fuel injection by the injectors 14 is permitted (YES result at step 210 in fuel injection routine in FIG. 4), and thus the routine goes to the fuel injection process following step 212.

When it is determined that $P_2 \leq 10$ kg/cm² at step 402 in FIG. 6, it is considered that there is not a sufficient amount of fuel in the reservoir tank 16 for continuing the injection. In this case, the routine goes to step 410 and the flag $F_2$ is set (1). As a result, at step 219 in the fuel injection routine of FIG. 4, step 221 is carried out (no determination at step 219) and a value of zero is moved into TAU, whereby the fuel injection routine is stopped.

Note, the memory area for storing the values of the flags $F_1$ and $F_2$ can be located in a non-volatile RAM, which allows the data of the flags $F_1 = 1$ and $F_2 = 1$ to be maintained without being cleared after the ignition key switch is turned OFF, for charging fuel to the fuel tank.

As will be seen from the above description, according to the embodiment shown in FIG. 1, when it is detected that the fuel tank 18 is empty, first the supply of fuel to the reservoir tank 16 is stopped by stopping a fuel discharge from the high pressure pump 22, and then the fuel injection from the injectors 14 is continued for as long as some pressure is maintained in the reservoir tank 16 ($P_2 > 10$ kg/cm$^2$), which allows the pressure in the reservoir tank 16 to be gradually reduced as the fuel in the reservoir tank 16 is consumed. As a result, the engine output torque is gradually decreased, and thus the driver is reminded that the fuel tank 18 must be filled.

Figure 7:
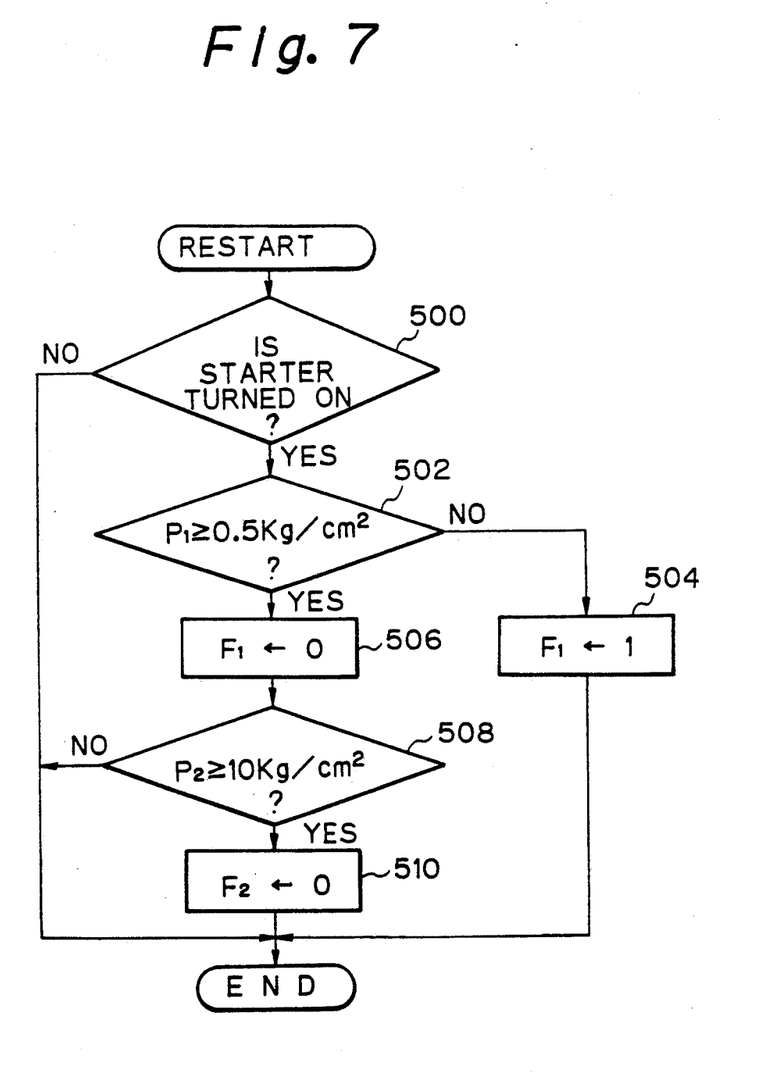

FIG. 7 is a routine for controlling the flags $F_1$ and $F_2$ when the engine is restarted after the fuel tank 18 has been filled. This routine, similar to the routine in FIG. 6, is located in the main routine and is executed when the ignition key switch is turned ON, and is executed for as long as the switch remains ON. At step 500, it is determined if the starter is turned ON, i.e., the engine is being started. When it is determined that the starter has been turned ON, the routine goes from step 500 to step 502 and it is determined if the value of the outlet pressure $P_1$ at the low pressure pump 20 is equal to or higher than the lower limit (0.5 kg cm$^2$). When the outlet pressure $P_1$ is smaller than the lower limit, the routine goes from step 502 to step 504, and the flag $F_1$ remains set (1) to thereby stop a fuel discharge operation by the high pressure pump 22 (NO result at step 202 in FIG. 4) until the fuel tank 18 is filled with fuel. When it is determined that $P_1 \geq 0.5$ kg/cm$^2$, i.e., a sufficient amount of fuel is held in the fuel tank 18, the routine goes to step 506 and the flag $F_1$ is cleared (0), to thereby allow the high pressure pump 22 to execute a fuel discharge operation to the reservoir tank 16 (YES result at step 202 in FIG. 4). Then, at step 508, it is determined if the pressure $P_2$ in the reservoir tank 16 is equal to or higher than the lower limit 10 kg/cm$^2$. When it is determined that $P_2 < 10$ kg/cm$^2$ at step 508, step 510 is by-passed and the flag $F_2 = 1$ state is maintained, to thereby allow the routine in FIG. 6 to by-pass the fuel injection routine (steps 212 to 220 in FIG. 4) and to go to step 211, so that the prohibiting of the fuel injection (TAU=0) is continued, since it is considered that there is a shortage of fuel in the reservoir tank 16. When it is determined that $P_2 \geq 10$ kg/cm$^2$ at step 508, the routine goes to step 510 and the flag $F_2$ (=0) is cleared, and thus the fuel injection routine is executed (YES result at step 219 in FIG. 4).

In the above embodiment, it is determined if there is fuel in the fuel tank 18 by measuring the pressure at the outlet of the low pressure pump 20. Instead, however, a float type sensor connected to a potentiometer can be arranged in the fuel tank 18 for determining a fuel shortage when the resistance value of the potentiometer becomes smaller than a predetermined value. Many alternative detection measures can be taken to determine a shortage of fuel in the fuel tank 18, such as an increase or decrease in the rotational speed of the electric motor for driving the low pressure pump 20, or a vibration or lift of the release valve 26 of the low pressure pump.

Although an embodiment of the present invention has been described with reference to the attached drawings, many modifications and changes can be made by those skilled in this art without departing from the scope and spirit of the present invention.

I claim:

1. A fuel supply system for a fuel injection internal combustion engine having injectors for injecting an amount of fuel into the engine, said system comprising:
   a fuel tank;
   a fuel line connecting the fuel tank to the fuel injectors;
   a reservoir tank arranged on the fuel line and adjacent to the fuel injectors, for storing an amount of fuel directed to the injectors;
   a high pressure pump arranged on the fuel line for introducing fuel from the fuel tank into the reservoir tank;
   means for detecting that the fuel tank is empty;
   means for prohibiting an operation of the high pressure pump when it is detected that the fuel tank is empty;
   means for detecting whether an amount of fuel remaining in the reservoir tank is sufficient to continue the operation of the engine after it is detected that the fuel tank is empty; and
   means for prohibiting the operation of the injector after it is detected that the amount of fuel remaining in the reservoir tank is not sufficient to continue the operation of the engine.

2. A fuel supply system according to claim 1, wherein said second detecting means comprise a sensor for detecting a pressure in the reservoir tank, and means for determining that the pressure detected in the reservoir tank is larger than a predetermined value, to thereby determine if a sufficient amount of fuel remains in the reservoir tank.

3. A fuel supply system for a fuel injection internal combustion engine having injectors for injecting an amount of fuel into the engine, said system comprising:
   a fuel tank;
   a fuel line connecting to the fuel tank to the fuel injectors;
   a reservoir tank arranged on the fuel line and adjacent to the fuel injectors, for storing an amount of fuel directed to the injectors;
   a high pressure pump arranged on the fuel line for introducing fuel from the fuel tank into the reservoir tank;
   a low pressure pump arranged on the fuel line between the fuel tank and the high pressure pump;
   means for detecting that the fuel tank is empty including a sensor for detecting a pressure at an outlet of the low pressure pump and means for determining that the detected pressure is smaller than a predetermined value to thereby detect that the fuel tank is empty;
   means for prohibiting an operation of the high pressure pump when it is detected that the fuel tank is empty;
   means for memorizing after the engine is stopped, that the operation of the high pressure pump was prohibited before the engine was stopped; and
   means for canceling the prohibiting operation by detecting that fuel is filled in the fuel tank, said canceling means comprising a sensor for detecting a pressure at an outlet of the low pressure pump, said means for canceling including means for determining if a pressure at the outlet of the low pressure pump is higher than a predetermined value, and means for allowing the high pressure pump to operate when it is determined that the pressure at the outlet of the low pressure pump is higher than the predetermined value.

4. A fuel supply system for a fuel injection internal combustion engine having injectors for injecting an amount of fuel into the engine, said system comprising:
   a fuel tank;
   a fuel line connecting the fuel tank to the fuel injectors;

a reservoir tank arranged on the fuel line and adjacent to the fuel injectors, for storing an amount of fuel directed to the injectors;

a high pressure pump arranged on the fuel line for introducing fuel from the fuel tank into the reservoir tank;

means for detecting that the fuel tank is empty, and;

means for prohibiting an operation of the high pressure pump when it is detected that the fuel tank is empty;

means for memorizing, after the engine is stopped, that the operation of the injectors was prohibited before the engine was stopped; and means for canceling the prohibiting operation by detecting that fuel is filled in the reservoir tank said canceling means comprising a sensor for detecting a pressure at the reservoir tank, said means for canceling including means for determining if a pressure in the reservoir tank is higher than a predetermined value, and means for allowing the fuel injectors to operate when it is determined that the pressure at the reservoir tank is higher than the predetermined value.

* * * * *